Sept. 2, 1958 J. MAURICE ET AL 2,850,131
CENTRIFUGAL CLUTCH
Filed Dec. 17, 1953 6 Sheets-Sheet 1

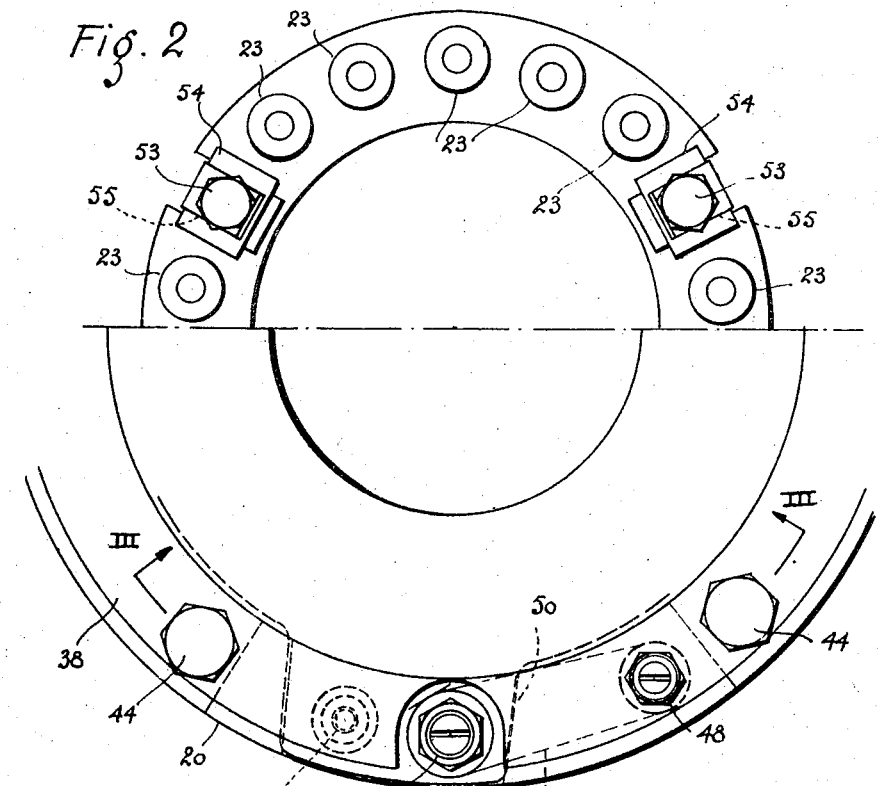
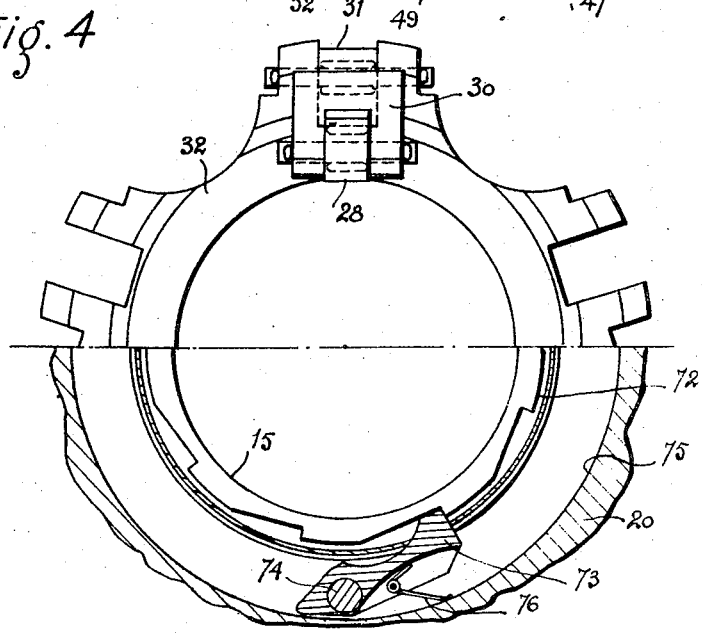

Sept. 2, 1958  J. MAURICE ET AL  2,850,131
CENTRIFUGAL CLUTCH
Filed Dec. 17, 1953  6 Sheets-Sheet 3

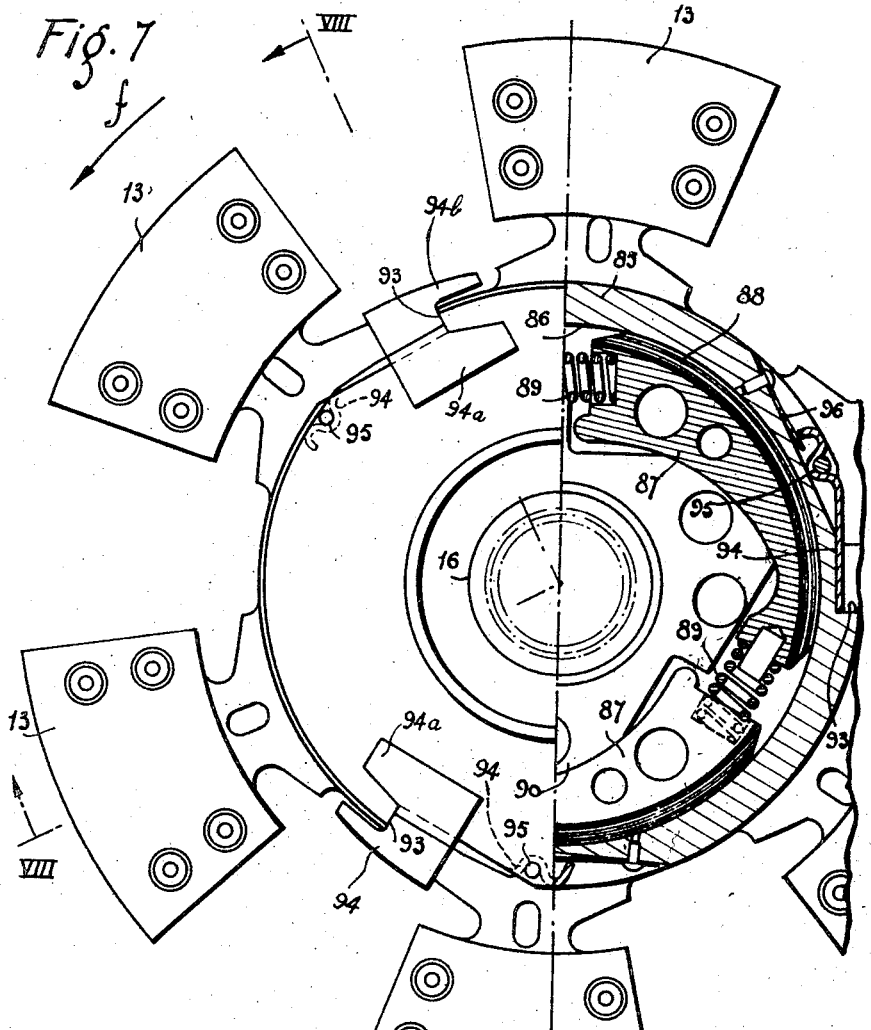
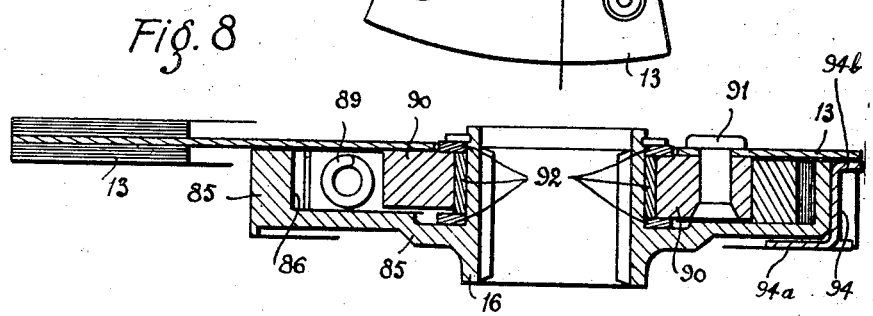

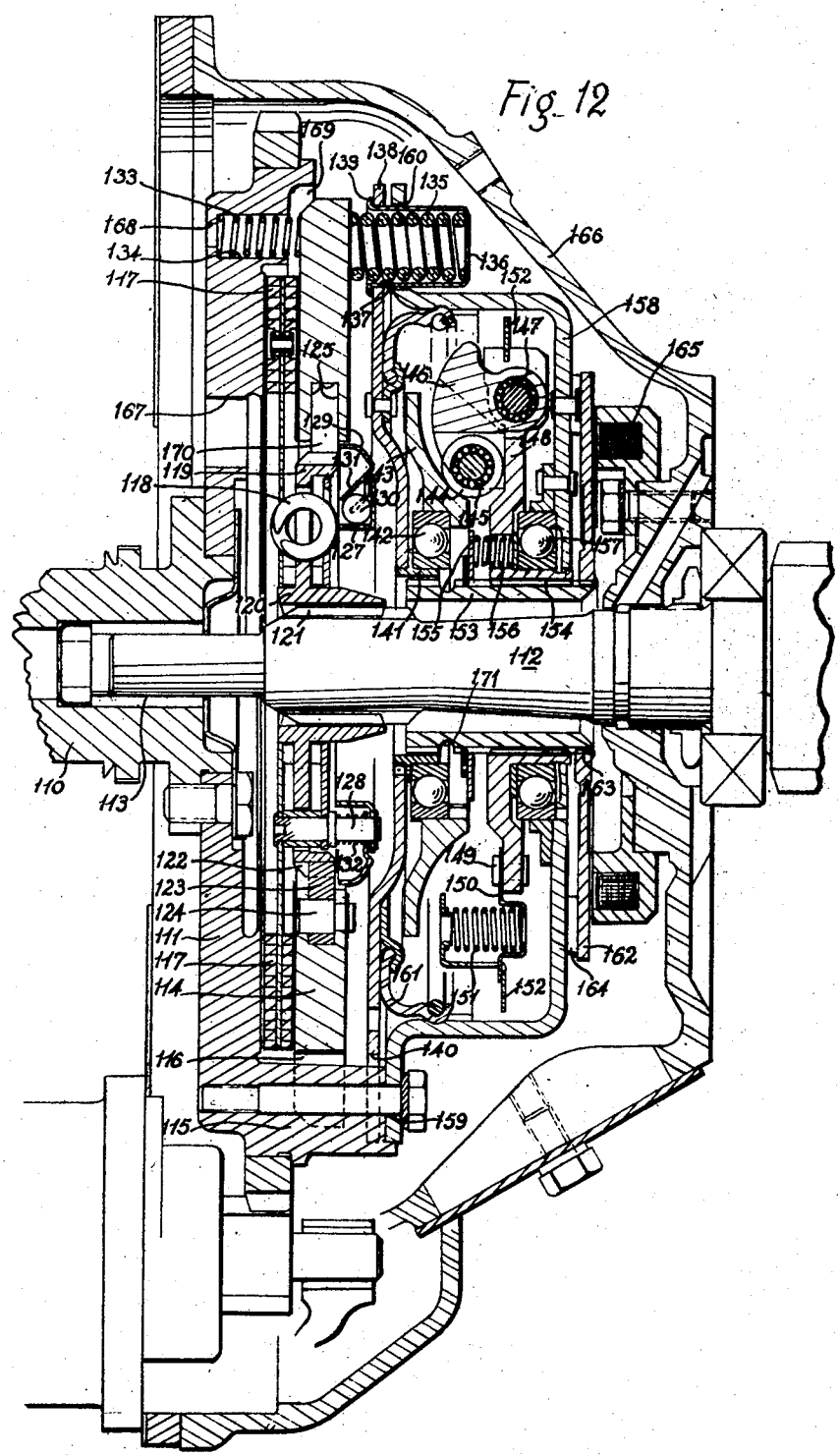

United States Patent Office 2,850,131
Patented Sept. 2, 1958

2,850,131

CENTRIFUGAL CLUTCH

Jean Maurice, Ablon, and Michel Rist, Paris, France, assignors to Societe Anonyme Francaise du Ferodo, Paris, France, a corporation of France Application December 17, 1953, Serial No. 398,835

Claims priority, application France December 23, 1952

4 Claims. (Cl. 192—105)

The present invention relates to a centrifugal clutch of the kind in which at least one friction disc coupled with the driven shaft is adapted to be gripped between a reaction plate and a presser plate rigidly rotatable with the motor shaft, the clutch springs being disposed between the presser plate and a transfer plate which is connected axially but in freely rotatable fashion with a cam subjected to the action of blocks, the block supporting member being capable of being actuated at will by the motor shaft or immobilised, for example with the aid of an electro-magnet, with a view to obtaining the clutching or declutching action.

The usual centrifugal clutches of this nature are accompanied by the disadvantage of a complicated construction with considerable axial bulk and frequent damage due to introduction into the sensitive centrifugal mechanism of dust emanating from the clutch linings. Furthermore there are also encountered in these clutches of the usual kind frequent wedging effects, noises and vibration and also an increased wear on the clutch linings due to a too greatly extended progressive nature of the clutching action, with local wear of the cam associated with the blocks. On the other hand their use may rise to sudden impact upon a change over from one speed to another or to an acceleration lacking in freedom.

The present invention has for its object a centrifugal clutch devoid of these drawbacks and having a completely satisfactory operation combined with a simple and compact construction.

According to one feature of the invention, the block holder and the cam are housed in a closed casing having means for effecting separation from the frictional zone of the friction disc. Owing to this arrangement dust is unable to obtain access to the casing, in which the lubricating oil for the centrifugal mechanism accordingly remains uncontaminated. This fact can be taken advantage of according to the invention by mounting the blocks and cam followers on roller bearings or the like, which ensures a very gentle operation.

According to another feature of the invention, the casing is rigid with the reaction plate, while the block supporting member is mounted on the said housing through the medium of an antifriction bearing, a sleeve being supported in sliding fashion by the block supporting member and rigidly carying a disc externally of the casing, which disc is disposed between the said casing and a fixed electro-magnet for immobilisation of the block supporting member, springs housed within the casing tending to displace the sleeve in relation to the casing, so that a lining located between the disc and the casing will normally be gripped between the casing and the said disc. Owing to this arrangements a simple and compact construction is obtained.

According to another feature of the invention, passages are provided in the reaction plate, while the friction disc is formed with vanes opposite the linings, so that an effective circulation of cooling air is produced in contact with the friction surfaces, even upon engagement of the clutch.

In one form of embodiment the presser plate is caused to move away from the reaction plate by at least three small tangential flexible tongues in such a way as to render the said two plates rigid without play in rotation but free in relation to one another as regards translatory motion. Owing to this arrangement the presser plate is maintained exactly centered in relation to the reaction plate and to the bearings thereof, and is free from all dangerous vibrations. Slight vibrations may occur, but these have no harmful effect on the manner of displacement of the presser plate in relation to the reaction plate, owing to the connection between these two plates according to the invention by means of the small tongues.

Preferably, the centrifugal mechanism is carried by the casing secured to the reaction plate, and each tongue is connected at one end to the casing and at the other end to the presser plate.

The presser plate, the casing and the centrifugal mechanism thus form together with the cam and the transfer plate a selfcontained assembly, which is adjusted once and for all and may be mounted or dismantled on the reaction plate as a unit, which does away with the necessity for any reference marks and considerably facilitates the assembly.

In one embodiment of friction clutch according to the invention a torque limiting means is inserted between the linings and the hub of the friction disc in order to ensure transmission of the torque however great it may be in the normal direction, but limited to a predetermined value in the opposite direction. Owing to this arrangement lower speeds can be put in without danger when the centrifugal clutch is applied to a motor vehicle, and the mechanism is protected against any sudden acceleration.

The invention furthermore comprises means for reducing the slip period of the centrifugal clutch and also the wear on the linings, while maintaining a progressive nature favourable to low speeds, and also for preventing any local wear on the cam associated with the blocks. According to these means the friction disc of the centrifugal clutch possesses opposite the linings a thickness which is compressible in resilient fashion.

Other objects, features and advantages of the invention will become apparent from the following description of various embodiments given by way of example with reference to the accompanying drawings, in which Fig. 1 is a longitudinal section through a clutch according to the invention.

Fig. 2 is an elevational view of this clutch to reduced scale according to the arrows II—II in Fig. 1, parts being omitted.

Fig. 4 is an elevational view of the clutch to reduced scale, parts being shown in section along the line IV—IV in Fig. 1.

Fig. 7 is a partial view in elevation of a modified friction disc, showing parts in section.

Fig. 8 is a corresponding view in section along the line VIII—VIII in Fig. 7.

Fig. 12 is a view similar to Fig. 1, but refers to a modification of the clutch.

Figure 1:
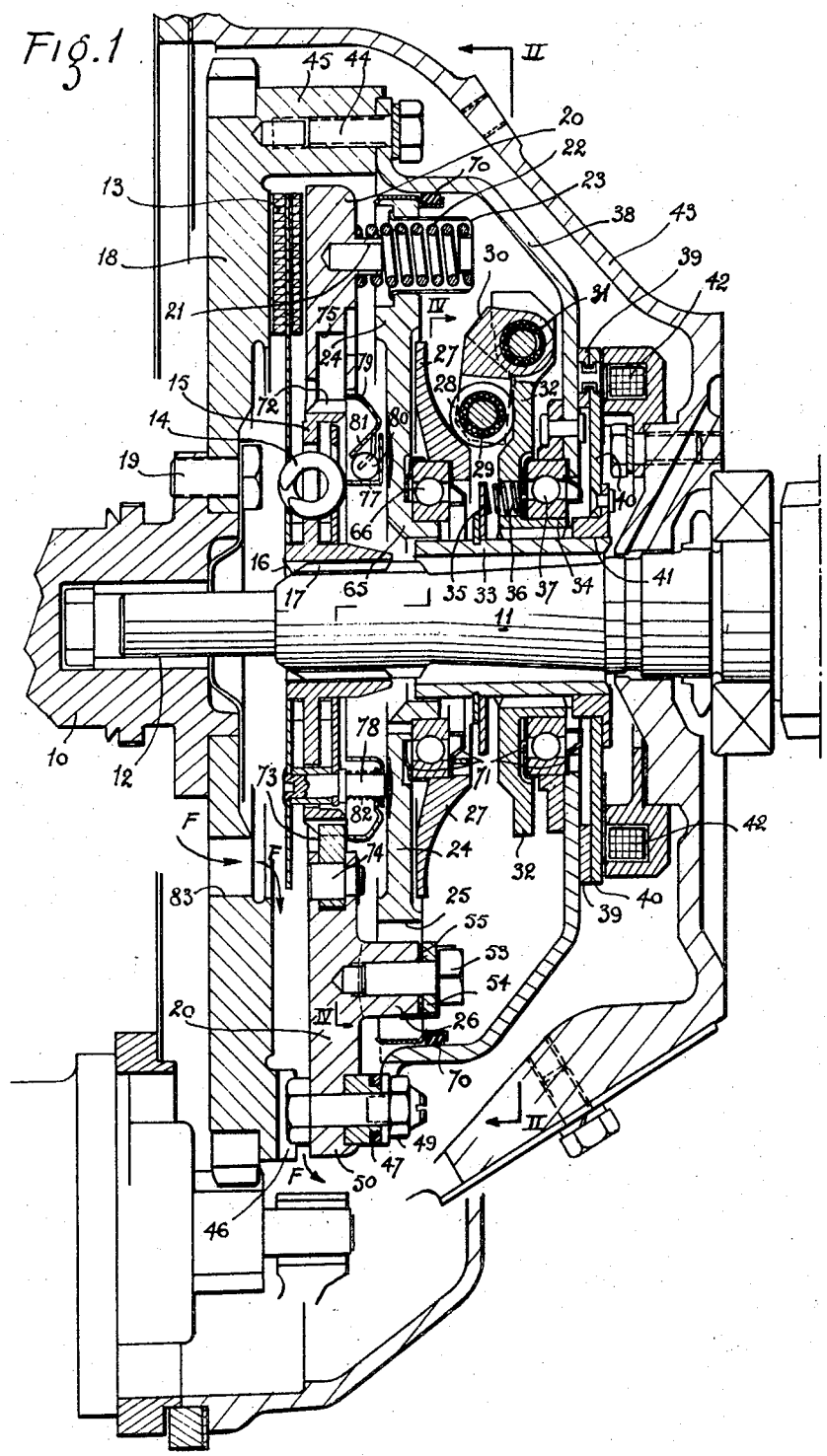
Figure 3:
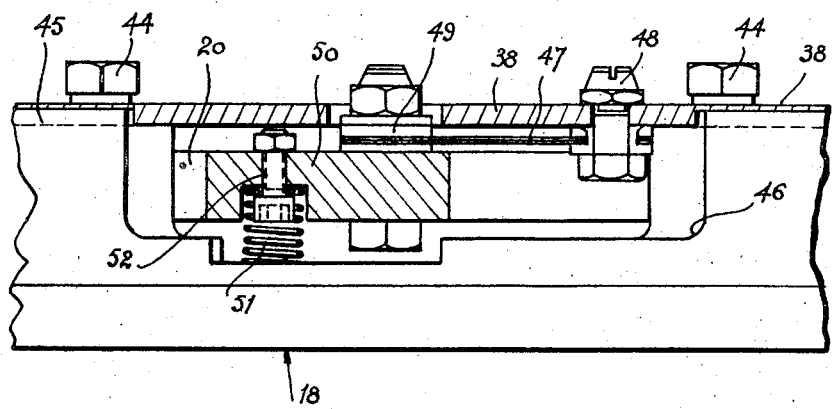
Fig. 3 shows to enlarged scale a section through the clutch taken along the arcuate line III—III in Fig. 2.

In the embodiment illustrated in Figs. 1 to 4, which relates by way of example in a non-limiting sense to an adaptation of the invention to a single-disc clutch for motor vehicles, the clutch is adapted to connect or disconnect an engine shaft 10 with a driven shaft 11 journalled at the end at 12 in the motor shaft 10.

The clutch itself (Fig. 1) comprises a friction disc 13 coupled by means of torsional damping springs 14 with the flange 15 of a boss 16 engaging over grooves 17 on the driven shaft 11. The friction disc 13 is inserted between two plates rigidly rotatable with the engine shaft 10 and capable of being moved towards or away from each other at will. One of these plates, designated 18, forms a flywheel and reaction plate and is secured to the shaft 10 by means of screws 19. The other plate 20, which forms the presser plate, is mounted for rigid rotation with but free to perform translatory motion in relation to the reaction plate 18, as will be described in detail later.

As will be seen more particularly from Fig. 1, the flange 15 extends opposite and into the interior of the presser plate 20 and comprises a peripheral rim of teeth 72 (Figs. 1 and 4) co-operating with pawls mounted in rotary fashion at 74 in a recess 75 in the plate 20. Dependent upon the fact as to whether the plate 20 is rotating or not the pawls 73 are either moved away on the outside of the teeth 72 by centrifugal force, or they are moved into engagement with the teeth 72 under the action of the springs 76, which enables the engine to be started up by movement of the vehicle.

However, in order to prevent the pawls from moving into engagement with the teeth if the engine should stall when the vehicle is moving at high speed, a ring 77 is provided at 78 on the flange 15, while an annular plate 79 adjacent the ring is mounted to be movable on the flange between a position in which it exposes the teeth 72 and a position in which it covers the same. Balls 80 are located between the ring 77 and sloping portions 81 on the plate 79, so that under centrifugal action the balls move the plate 79 into the covering position when the vehicle is in motion, but leave the plate in the aside position which it tends to adopt under the effect of springs 82 when the vehicle is stationary or moving slowly. This plate 79, therefore, in no way opposes a starting up of the engine by action emanating from the vehicle, but avoids sudden jolts and damage of any kind if the motor should stall during travelling.

It is the translatory control of the presser plate 20 by which the clutching or declutching action is effected. According to the means provided for this control the presser plate 20 comprises projections 21 distributed at regular intervals along the periphery of the plate and extending outwardly from the face thereof opposite the disc 13. These projections may be provided with apertures for balancing purposes. Over each projection 21 there engages and is centered a clutch spring 22, which is received and centered at its other end in a cup 23 carried by a transfer plate 24 of substantial thickness. The transfer plate 24 is mounted to be rigidly rotatable but freely capable of translatory motion on the plate 20 by means of mortises 25 provided in the plate 24 and adapted to receive tenons 26 on the plate 20. The springs 22 assist in centering, and by reason of the relatively powerful effect always exerted thereby they prevent any wear between the tenons 26 and the mortises 25, so that these are subject to practically no wear.

In order to limit the degree of separation between the plate 24 and the plate 20 each tenon 26 carries, secured thereto by means of screws 53, an abutment 54 overlying the mortise 25 on each side. A removable wedge 55 is inserted between the tenon 56 and the abutment 54 in order to regulate the maximum separation between the plates 24 and 20.

The plate 24 extends up to the neighbourhood of the driven shaft 11, where it comprises an annular cylindrical edge portion 65, on which is mounted a ball bearing 66 arranged to receive and transmit axial forces.

On the ball bearing 66 there is mounted a rotary cam 27, with which there co-operate rollers 28. These rollers are mounted to be rotatable (Figs. 1 and 4) by means of roller bearings 29 on blocks 30, which in turn are pivotable by means of roller bearings 31 on a block-supporting plate 32.

An externally grooved sleeve 33 extends in spaced relation about the shaft 11 and is mounted to slide in the block-supporting plate 32 by means of grooves 34. An annular plate 35 is maintained in fixed relation on the sleeve 33 by means of a keeper, and springs 36 extending between the plate 35 and a portion integral with the plate 32 urge the plate 35, and in consequence the sleeve 33, in the direction of the shaft 10.

The plate 32 is carried through the medium of a roller bearing 37 by a casing 38. Against the latter there is applied externally an annular friction lining 39 carried by a disc 40 composed of mild steel. The disc 40 is rigidly mounted at 41 on the sleeve 33 and is urged against the casing under the action of springs 36. An electro-magnet 42 is located opposite the mild steel disc 40 and is secured to the fixed cover 43, which surrounds and protects the clutch in the assembled condition.

The casing 38 extends into the interior of the cover 43 and surrounds the centrifugal control device for the presser plate 20, including the transfer plate 24. The casing 38 is secured by means of screws 44 (Figs. 1 and 3) on a peripheral flange 45 on the reaction plate 18, this flange surrounding the friction disc 13 and the presser plate 20. It will thus be seen that the plate 18, the flange 45 and the casing 38 define within the fixed cover 43 a rotary chamber which is closed generally and, additional to the cover 43, protects not only the clutch proper 13, 20, 24, but also the centrifugal control means 27, 30, 32, 33 of the clutch.

The flange 45 includes three recesses 46 distributed at 120° apart, each forming an open housing extending right through in a radial direction but closed axially on one side by the moving portion of the plate 18 and on the other side by the casing 38, which extends over the recess. In each recess 46 there is located a small tangential tongue 47 pivotally connected at one end at 48 to the casing 38 and at the other end at 49 to a radial projection 50 on the presser plate 20. The tongue is arranged in such a way as to operate normally under pull. A clutch separating spring 51 is secured at 52 to the projection 50 and rests with its other end against the plate 18. The spring 51 furthermore ensure that the plates 20 and 24 are held in place axially.

It is the three tongues 47 which ensure tangential actuation and centering of the plate 20, emanating from the plate 18, and permit at the same time of free axial displacement of the plate 20 in relation to the plate 18 even if wear on the linings in uneven.

The operation will be obvious from the above description.

When the electro-magnet 42 is not excited the friction lining 39 is applied against the casing 38. The sleeve 33 and the block-supporting member 32 are actuated together with the casing 38, the plate 18 and the engine shaft 10. The blocks 30 are raised and exert pressure on the cam 27, the transfer plate 24 and, through the medium of the clutch springs 22, the presser plate 20. The friction disc 13 is gripped between the latter and the reaction plate 18. The shaft 11 is operated.

If the electro-magnet 42 is excited, the disc 40, the sleeve 33 and the block-supporting member 32 are immobilised. The blocks fall, and the plate 20 exerts no pressure and is separated by means of the springs 51. The clutch is released.

It will be appreciated that the connection of the plate 20 and the plate 18 by means of the tongues 47 in accordance with the invention results in a particular and marked advantage in the form of centrifugal clutch to which the invention applies. The plate 20 is in actual fact subjected to very difficult conditions of operation, more particularly when the clutch is released, since instead of operating alone it carries the transfer plate 24, the bearing 66 and the cam 27, which parts must be very resistant and rigid and are, therefore, comparatively heavy, and also the springs 22, which form a heavy assembly by reason of their number, the inertia being considerable.

Owing to the tongue 47 the plate 20 is maintained centered in relation to the plate 18 and is securely held in the tangential direction in relation thereto. Apart from overcoming together with the other parts 13 and 18 of the clutch proper undesirable frictional effects, noises and wedging action in operation the plate 20 forms an efficient support and withholds vibrations from the transfer plate 24. As already stated in the above, the plate 24 may thus be provided with a substantial thickness, which ensures really good transmission of the axial forces. It will also be appreciated that the tongues 47 extend in a transverse plane in the neighbourhood of that in which is located the centre of gravity of the assembly 20, 24, 27, as will be seen from Fig. 1, so that the suspension of this assembly 20, 24, 27 ensures in respect thereof a correct position in relation to the reaction plate 18.

From another point of view the provision of the tongues permits the suitable mounting of even a heavy transfer plate on the presser plate 20, rather than on the reaction plate 18, and an assembly of this nature, in combination with the connection of the tongues according to the invention to the casing 30, rather than to the plate 18, has the particular advantage of making the entire assembly 38, 20, 24, 27, 30, 32, 33 and 40 independent, with the elements thereof centered and adjusted in relation to one another once and for all.

An independent assembly of this nature can be assembled or dismantled immediately by means of the screws 44 on the plate 18, without any kind of adjustment, once the position of the screws 44 has been suitably determined.

The invention thus enables complicated reference markings, which have been necessary in centrifugal clutches of the usual kind, to be dispensed with, and it renders the assembly at the very least equally as simple as that in the case of known mechanical clutches.

It will be noted that the direct centering of the cam 27 on the transfer plate 24 enables this cam to adapt itself to an irregular action of the blocks 30, owing to the fact that the plate 24 itself may assume without any inconvenience a slight out-of-true movement by reason on the one hand of the play existing between the tenons 26 and the mortises 25, with the corrective action of the springs 22, and on the other hand of the connection by means of the tongues 47.

The bearings 66 and 37, which may be lubricated by the natural circulation of oil, are practically isolated from the frictional zone of the clutch at 13 by the plate 24, which extends substantially up to the casing 38. An isolation of this nature is completed for example by an annular seal 70 mounted on the plate 24 opposite the circular periphery thereof and applied against a cylindrical portion of the casing 38. In a modification the seal 70 may be replaced by a baffle device. Furthermore, the two bearings 66 and 37 are equipped with deflectors 71, which completely surround each of them and thus prevent any loss of lubricant or any entry of dust.

Apart from the arrangements which have been described in the above invention provides means for ensuring a favourable ventilation of the clutch, and more particularly of the friction surfaces. According to these means, apertures 83 are provided in the reaction plate 18 and are located between the axis of the clutch and the zone opposite to that in which there extend the friction linings of the disc 13. These friction linings and their immediate support are in the form of well-spaced vanes, as will be seen more particularly from the lower part of Fig. 1. For example the linings and their immediate support may form vanes separated by spaces of substantially the same size. Owing to this arrangement an ample circulation of cooling air is created during the operation in the direction of the arrows F in Fig. 1, which air, owing to the suction effect brought about by the bladed disc 13, passes through the apertures 83 from an axial zone, washes over the friction surfaces of the parts 13, 18 and 20, both, both upon the clutching as well as the declutching operation, and passes through the recesses 46 in the neighbourhood of the cover 43.

In a modification (Figs. 5 and 6) the arrangement is similar to that described in the above in conjunction with Figs. 1 to 4, except with regard to the separating springs.

Figure 5:
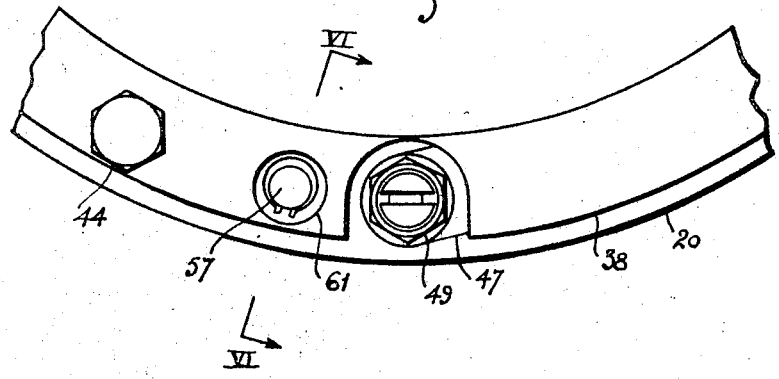
Fig. 5 is a view similar to the lower portion of Fig. 2, but refers to a modification.
Figure 6:
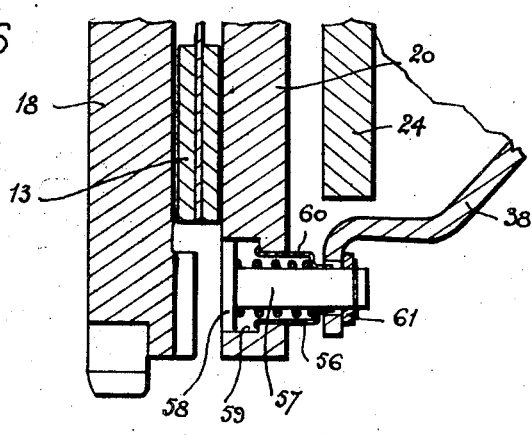
Fig. 6 is a partial view of this modification in section, taken along the line VI—VI in Fig. 5.

In the embodiment according to Figs. 5 and 6 each separating spring, designated 56, acts, not between the plate 20 and the plate 18, but between the plate 20 and the casing 38. Each spring 56 is mounted about a shouldered pin 57 and is inserted between the head 58 of this pin, which is arranged to slide in an opening 59 in the plate 20, and the end of a cup 60 abutting about the opening 59. The pin 57 passes freely through the casing 38 and possesses at the end a washer 61 located against the casing.

In a further modification (Figs. 7 and 8) the arrangement is similar to that described above with reference to Figs. 1 to 4, but includes a modified friction disc comprising means not only for permitting a starting up of the motor upon actuation by the vehicle at low speeds which are not dangerous thereto, but also for limiting the braking torque of the engine to a suitable value.

In Figs. 7 and 8 there is shown at 16 the grooved hub of the friction disc, this disc being constructed at 13 to form vanes for the purpose of producing a forced circulation of cooling air. The hub 16 is integral with a drum 85 having an inner cylindrical surface 86. Against the surface 86 there bear with friction three shoes 87 furnished on the outside with friction linings 88. The shoes 87, which are devoid of any form of attachment and are separated by compression springs 89 of appreciable length, are located between the surface 86 and an inner cam 90. The latter is secured at 91 to the friction disc 13 and is mounted about the hub 16 through the medium of rings 92, which form bearing elements upon the occurrence of relative rotation between the cam 90 and the hub 16.

In the normal direction of movement, in which the friction disc 13 moves the hub 16 in the direction of the arrow f in Fig. 7, the cam 90 forces the shoes 87 against the surface 86 of the drum 85, which ensures a rigid rotational connection irrespective of the value of the torque transmitted. In the reverse direction to the arrow f the cam 90 releases the shoes 87, and these, bearing against the cam 90 and under the action of the springs 89, act in the manner of three brake blocks against the surface 86. The torque capable of being transmitted in the reverse direction can thus be controlled at will by the characteristics of the spring 89, which are such that a braking action by the motor never results in slip on the part of the driving wheels, irrespective of the speed and with regard to minimum adherence.

It will be appreciated that the torque limiting means thus formed are of simple and convenient construction and cheap to produce, and that they adapt themselves particularly well to the centrifugal clutch described and illustrated, this clutch having for the accommodation of the torque limiting means an axial space of comparatively large size and a reduced diametrical space. The shoes 87 may accordingly be wide in the axial direction and in small spacial disposal from the axis, which withholds from the torque limiting means the effect of variations in the speed of the engine while leaving them with a high degree of efficiency. Furthermore, the form which it is thus possible to give to the torque limiting means in the particular application thereof to centrifugal clutches of the kind contemplated in the invention enables long springs 89 to be provided, as already set forth in the above, that is to say, having a practically constant force independently of the degree of separation of the shoes, which may vary slightly with wear of the lining 88. In their application to a centrifugal clutch as described the torque limiting means, in addition to avoiding slip on the part of the driving wheels, also permit of elimination of all deterioration of the sensitive follower block mechanism under the effect of sudden variations in speed, and they ensure the putting in of lower speeds without danger despite the lack of control which a user has over the automatic operation of the centrifugal clutch.

Three recesses 93 distributed at regular intervals are provided in the periphery of the drum 85. Into each recess 93 there extends a small bar 94 pivoted at 95 on the drum 85 and urged by a spring 96 in a direction causing the bar to assume an aside position against the bottom of the recess.

As in the embodiment according to Fig. 1, pawls 73 are pivotally mounted on the presser plate and are urged by springs in a direction tending to cause the pawls to engage in the recesses 93.

If the presser plate is in rotation, the pawls are moved aside by centrifugal force away from the recesses 93. If the presser plate is not rotating, the pawls engage in the recesses 93, which enables the motor to be started up by the vehicle. If the vehicle is travelling at high speed, the bars 94 are moved away by the centrifugal action and prevent the pawls from engaging in the recesses. If the vehicle is stationary or moving slowly, the bars 94 rest against the bottom of the recesses and permit the pawls to engage. As in the embodiment according to Fig. 1, the motor can be started up by movement of the vehicle, unless the rate of movement is too quick, which would be dangerous.

Figure 9:
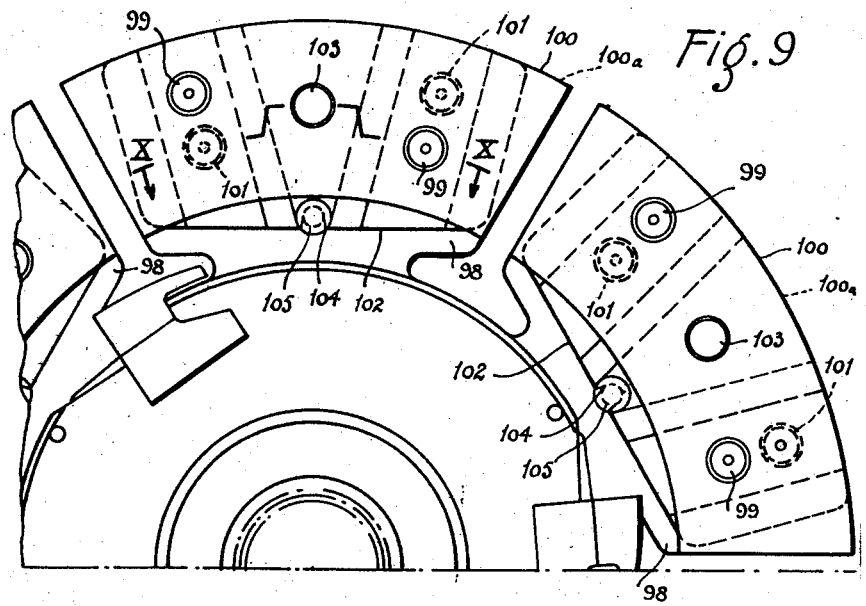
Fig. 9 is a partial view in elevation of a further modification of friction disc.
Figure 10:
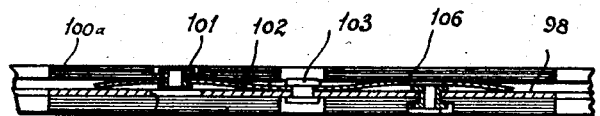
Fig. 10 is a sectional view of this disc taken along the line X—X in Fig. 9.
Figure 11:
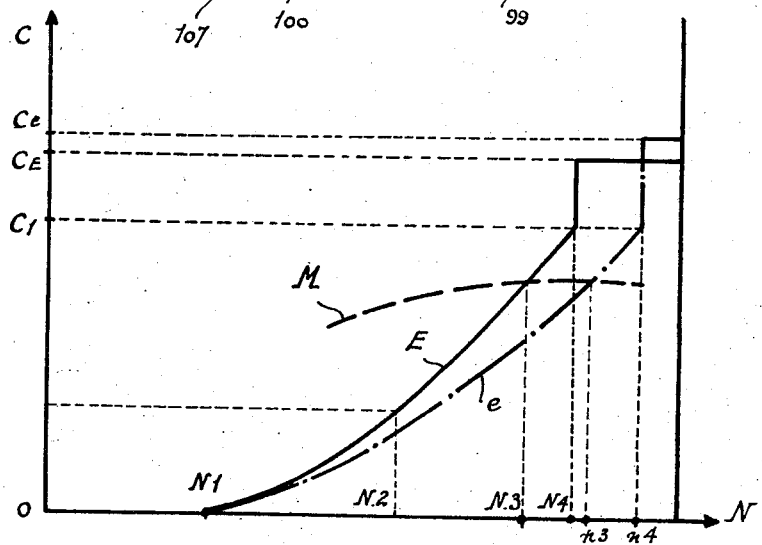
Fig. 11 is a diagram illustrating the operation of a clutch equipped with a disc such as that shown in Figs. 9 and 10.

Reference will now be made to Figs. 9 to 11, which illustrate a further modification of the friction disc of the centrifugal clutch. The disc (Fig. 9) possesses about its periphery spaced vane segments 98. One lining 100 of the two provided on each vane 98 is applied and rigidly secured to the vane 98 by means of rivets 99, while the other lining 100a is secured by rivets 101 to a resilient strip 102 having a sinuous profile. The resilient strip 102 is inserted between the lining 100a and the vane 98 and is secured to the latter by means of a rivet 103. The strip also comprises a slot 104 engaging about a stud 105 in the vane segment 98, which prevents the strip from turning about the rivet 103 while leaving the same with a sufficient latitude with regard to displacement and resilient deformation. Opposite the rivets 99 the strip 102 possesses openings 106, while opposite the rivets 101 the vane 98 possesses openings 107. The disc opposite the linings has a thickness varying between a maximum value, at which the resilient strip 102 at rest is warped and separated from the lining 100a and the vane 98, and a minimum value, at which the resilient strip 102 is flattened and gripped by continuous engagement between the lining 100a and the vane 98, the rivets 99 and 101 being housed respectively in the openings 106 and 107.

A friction disc of this nature, having a thickness which is resiliently compressible opposite the linings, has the remarkable property when applied to a centrifugal clutch of reducing with advantage the usually too extended progressive nature of a clutch of this kind, and of cutting down wear on the linings. In a centrifugal clutch, therefore, this compressible disc discloses a behaviour which is the reverse of that occurring in other clutches, where it accentuates the progressiveness. Moreover a disc of compressible thickness, when applied to a centrifugal clutch, protects the cam associated with the blocks against all local wear.

These properties are illustrated in the diagram according to Fig. 11. There is entered on the abscissa at ON the angular velocity of the engine, the torques being shown on OC. The curve M in extended dashes illustrates the variations in the engine torque according to the speed of the engine, while the curve $e$ illustrates the variations in torque capable of being transmitted by the clutch in accordance with the speed of the engine when the centrifugal clutch is equipped with a clutch disc which is not compressible in thickness.

Reference will first be made to the curve $e$. As soon as the engine slightly exceeds the slow speed $N_1$ (Fig. 11) the blocks, by way of the rollers 28 (Fig. 1), exert pressure on the cam 27 and the transfer plate 24. As regards the speed $N_1$, the pressure is just sufficient to move the linings into contact. When this speed is somewhat exceeded, the pressure is still not sufficient to overcome the springs 22, and the presser plate and transfer plate assembly press against the linings on the friction disc without compressing the springs 22. A pressure of this nature is too weak for the clutch to overcome the engine torque M (Fig. 11), and slip occurs. On the other hand the springs 22, still too strong, immobilise the cam 27 axially. The follower blocks remain practically immobile. They exercise a local knocking on the cam, because the increasing speed of the engine applies an increasing centrifugal force to the blocks. The torque increases only slowly, as it is only the speed of the engine which acts to vary the torque, the radius separating the blocks from the axis remaining fixed.

At a value $n_3$ in respect of the speed of the engine the curve $e$ crosses the curve M. The clutch is engaged. The torque capable of being transmitted by the clutch then continues to increase up to an engine speed value of $n_4$, where it reaches a value of $C_1$. At this moment the force exerted on the cam is sufficient to overcome the springs and the blocks are no longer held back but move abruptly until the springs 22 have been completely compressed. The increase in resistance of the springs is in actual fact greatly exceeded at all times by the increase in effect of the blocks, which act on an increasing radius. A torque $C_e$ is reached without the speed in practice having had time to change. The blocks are then buttressed and an increase in the load from then on produces no variation in the torque $C_e$.

It will be seen from the above that the progressiveness of the clutch equipped with a disc of non-compressible thickness is very extended, and even too extended, whereby a prolonged slip of the friction surfaces is caused, resulting in rapid wear of the linings. Moreover the blocks, immobilised for a length of period against a local zone of the cam, cause wear of the cam at this point, calling for the use of expensive materials if it is desired to avoid the necessity of frequently replacing or repairing the cam.

These drawbacks can be overcome if the centrifugal clutch is furnished with a disc of compressible thickness opposite the linings, for example a disc according to Figs. 9 and 10 or any other disc of similar effect.

The curve E in full lines (Fig. 11) illustrates the variations in torque capable of being transmitted by the centrifugal clutch when the latter is furnished with a disc of compressible thickness opposite the linings.

As soon as the engine slightly exceeds the slow speed $N_1$ (Fig. 11), the blocks press against the cam and the linings through the medium of the transfer plate and presser plate assembly, the springs of the clutch not being compressed. However, the pressure is already sufficient to press the discs together little by little opposite the linings. The cam is thus able to budge. The blocks are not stationary, but roll slightly along the cam, which does away with any risk of wear in this phase of operation. Furthermore the torque applied increases rapidly, since at that time the speed and the radius of the blocks increase.

The friction disc reaches its minimum thickness at a speed of $N_2$, and from this moment on the operation develops as in the preceding case, with the difference that the torque increases much more quickly in accordance with the speed, as the follower blocks act with a larger radius. This radius remains constant at first and, the curves E and M cross at a speed $N_3$ very much less than the speed $n_3$, and the clutch is let in. The torque continues to increase up to a value $N_4$ of the motor speed, which is less than $n_4$, and reaches a value of $C_1$.

At this moment the force exerted on the cam is, as before, sufficient to overcome the springs, and the blocks complete their movement by compressing the springs 22 at once, without the speed $N_4$ varying to any appreciable extent. The maximum torque thus reaches $C_E$, which is smaller than $C_e$, as the springs 22 are compressed to a lesser degree when the blocks move into abutment (disc more greatly compressed).

It is possible by suitably selecting the resiliency of the strip 102 on the disc to bring the value $N_2$ corresponding to its total movement to the vicinity of $N_4$, and thus to avoid any arresting of the rollers against the cam, and in consequence any wear. The tension of the resilient device when fully compressed must correspond substantially to the force necessary to overcome the preconstraint of the clutch springs.

The progressiveness of the clutch is thus limited to a lower level although the slip period is changed to a more favourable value, in respect of which wear on the linings is greatly reduced.

It will be appreciated therefore, that the mechanism comprises in combination a block mechanism and a disc of compressible thickness opposite the linings, resulting in particular and surprising properties.

Reference will now be made to Fig. 12, where there is shown a modified form of clutch having in particular an insulation located between the centrifugal device and the friction zone.

In Fig. 12 there is shown an engine shaft 110, which is rigidly connected with the reaction wheel 111, while a driven shaft 112 is journalled at the end at 113 in the driving shaft 110. A clutch presser plate 114 surrounds the shaft 112 in spaced relation thereto and is mounted to be rigidly rotatable with but freely capable of translatory motion on the flywheel 111 by engagement of the tenons 115 on the wheel in the mortises 116 of the plate. A friction disc 117 is inserted between the wheel 111 and the plate 114 and is coupled by torsional absorbent springs 118 to the flange 119 of a hub 120 engaging over grooves 121 in the shaft 112.

The flange 119 extends opposite and into the interior of the presser plate 114 and comprises a peripheral rim of teeth 122 co-operating with pawls 123 mounted at 124 to be rotary in a recess 125 in the plate 114. Dependent on the fact as to whether the plate 114 is rotating or not, the pawls 123 are moved by centrifugal force away from the outside of the teeth 122, or are caused to engage in the teeth 122 under the action of suitable springs, which enables the engine to be started up by movement of the vehicle.

However, in order to prevent the pawls from moving into engagement with the teeth if the engine should stall when the vehicle is in motion, a ring 127 is provided on the flange 119 at 128, while an annular plate 129 adjacent the ring is movably mounted on the flange between a position in which it exposes the teeth 122 and a position in which it covers the same. Balls 130 engage between the ring 127 and inclined portions 131 on the plate 129, so that under the effect of centrifugal force the balls move the plate into the covering position when the vehicle is in motion, but leave the plate in the aside position, which it tends to adopt under the action of the springs 132, when the vehicle is stationary or moving slowly. In this way the plate does not oppose a starting up of the engine by movement of the vehicle, but avoids jolts if the engine should stall when the vehicle is in motion.

Springs 133, which are located in housings 134 evenly distributed about the periphery of the wheel 111, are applied against the presser plate 114 and tend to separate the latter from the wheel. Springs 135, which are more powerful than the springs 133 are applied against the other face of the plate 114 and are housed in circular casings 136. The latter pass through openings 137 equally distributed peripherally in a circular transfer plate 138 and comprise an angular edge 139, so that the springs 135 tend to separate the plate 114 and the plate 138. The circular transfer plate 138 possesses peripheral slots 140 engaging about tenons 115 on the wheel 111, so that the plate is rigidly rotatable with but freely capable of translatory movement in relation to the wheel 111 and the plate 114. The plate 138 extends up to the neighbourhood of the driven shaft 112, where it possesses a cylindrical annular edge against which is mounted a ball bearing 142 capable of receiving and transmitting axial forces.

On the ball bearing 142 there is mounted a rotary cam 143 of bell form, with which there co-operates rollers 144. These are mounted by means of roller bearings 145 on blocks 146, which in turn are pivoted by means of roller bearings 147 on a block-supporting plate 148. Secured to the periphery of the plate 148 at 149 are small plate members 150 disposed between the blocks 146 and connected by springs 151 to a ring 152, so that the blocks being moved by centrifugal action bear against the ring 152, while tending to be returned to their position of rest by the springs 151. For the purpose of simplification these springs 151 may also be omitted.

A grooved sleeve 153 extends in spaced relation about the shaft 112 and inside the plate 148, with which it engages in sliding fashion at 154. An annular plate 155 is maintained in fixed relation on the sleeve 153 by a keeper. Springs 156 extend between the plate 155 and a portion integral with the plate 148 tending to press the plate 155, and in consequence the sleeve 153, in the direction of the wheel 111.

The plate 148 is carried through the medium of a ball bearing 157 in a casing 158 surrounding the centrifugal arrangement and secured at 159 to tenons 115 on the flywheel 111. The casing 158 includes openings 160 for the passage of the tubular casings 136. An annular flexible seal 161 is disposed between the transfer plate 138 and the casing 158. A disc of mild steel 162 is rigidly mounted at 163 on the sleeve 153 externally of the casing 158, and is urged by springs 156 inside the casing against a friction lining 164 secured in the interior of the casing. An electro-magnet 165 mounted on the fixed clutch cover 166 extends opposite the disc 162.

In particular there will be appreciated the compact construction of the arrangement according to Fig. 12, primarily due to the housing of the active centrifugal elements within the casing. In particular the spring 156 disposed in the casing 158 does not result in any axial bulk.

The casing 158 and its contents represent an assembly which is insulated by the flexible seal 161 from the remainder of the apparatus, and more particularly the friction elements 117 and 162. The interior of the casing receives the oil which lubricates automatically by circulation all of the elements in the casing, and oil is prevented from leaving the casing in the axial region by means of a channel 171 provided in the sleeve 153 and forming a hood. The ball bearings 142 and 157 are preferably selected to be of the self-sealing type.

The oil thus insulated from dust emanating from the friction elements remains clear and uncontaminated and ensures proper lubrication. From another aspect it is a perfectly dry and accordingly effective friction which is obtained between the friction elements 117 and 164 and their co-operating surfaces.

Openings 167 are provided in the wheel 111, the housings 134 for the springs 133 are open at 168, a wide continuous passage 169 is located peripherally between the wheel 111 and the plate 114, and a large passage 170 is provided between the teeth 122 and the wheel 114 and increased by the recess 125, so that, as in the previous embodiments, an ample circulation of cooling air is brought about in operation. This circulation can be increased by means of vanes formed on the friction elements 117.

It will be understood that the invention is not limited to the embodiments described and illustrated, but includes all modifications falling within the scope of the annexed claims.

We claim:

1. A centrifugal clutch comprising in combination a driving shaft, a driven shaft, a reaction plate attached to said driving shaft, a disc coupled with said driven shaft, a presser plate adapted to grip said disc between it and said reaction plate, a flange on said reaction plate having openings passing radially therethrough, a removable casing secured to and carried from said flange, coplanar tangential flexible tongues extending in said openings and connecting said casing and said presser plate whereby the latter is suspended from said casing, a transfer plate slidingly supported from said presser plate, clutch springs disposed between said transfer plate and said presser plate, isolating means extending between said transfer plate and said casing substantially at the periphery thereof, a first thrust ball bearing of small diameter carried from inner contour of said transfer plate, a cam carried from said bearing, a second thrust ball bearing having same diameter as the first bearing and disposed in longitudinal vicinity thereto, said second bearing being carried from inner contour of said casing, a member carried from said second bearing, follower blocks pivoted on said member and adapted to act on said cam, said casing surrounding said bearings and said member, and means for braking or driving at will said member, whereby said casing, said presser plate, said transfer plate, said cam and said member form an independent adjusted assembly capable of being mounted on said reaction plate and dismantled therefrom as a unit.

2. A centrifugal clutch according to claim 1, wherein the plane of said tongues passes substantially through the centre of gravity of said transfer and presser plates and cam.

3. A centrifugal clutch comprising in combination a driving shaft, a driven shaft, a reaction plate attached to said driving shaft, a disc coupled with said driven shaft, a presser plate adapted to grip said disc between it and said reaction plate, coplanar tangential flexible tongues operatively connected to the reaction plate and presser plate, whereby said plates are rigid in rotation but axially movable with respect to each other, mechanism means sensitive to the rotation speed of said driving shaft to impart an axial pressure against said presser plate, releasing means for making said mechanism means inoperative, and a torque limiter means operative between said shafts, said torque limiter means being of the unidirectional type whereby accommodating the transmission of any torque in the direction wherein said tongues are under tension while limiting the torque in the other direction wherein said tongues are under compression.

4. A centrifugal clutch according to claim 3, wherein said torque-limiter means comprise clutch shoes, springs adapted to expand said shoes and a cam serving to apply said shoes in one direction only.

References Cited in the file of this patent

UNITED STATES PATENTS

| | | |
|---|---|---|
| 1,509,240 | Kloepper | Sept. 23, 1924 |
| 2,270,467 | Nutt | Jan. 20, 1942 |
| 2,497,544 | Gravina | Feb. 14, 1950 |
| 2,559,765 | Gravina et al. | July 10, 1951 |
| 2,564,841 | Gravina | Aug. 21, 1951 |
| 2,672,226 | Zeidler | Mar. 16, 1954 |
| 2,745,268 | Reed | May 15, 1956 |

FOREIGN PATENTS

| | | |
|---|---|---|
| 29,371 | Great Britain | of 1904 |
| 937,403 | France | Mar. 8, 1948 |
| 631,783 | Great Britain | Nov. 9, 1949 |
| 999,175 | France | Oct. 3, 1951 |